Dec. 18, 1923.
W. KLINGE
CHILD'S VEHICLE
Filed Feb. 14, 1920
1,477,830
2 Sheets-Sheet 1
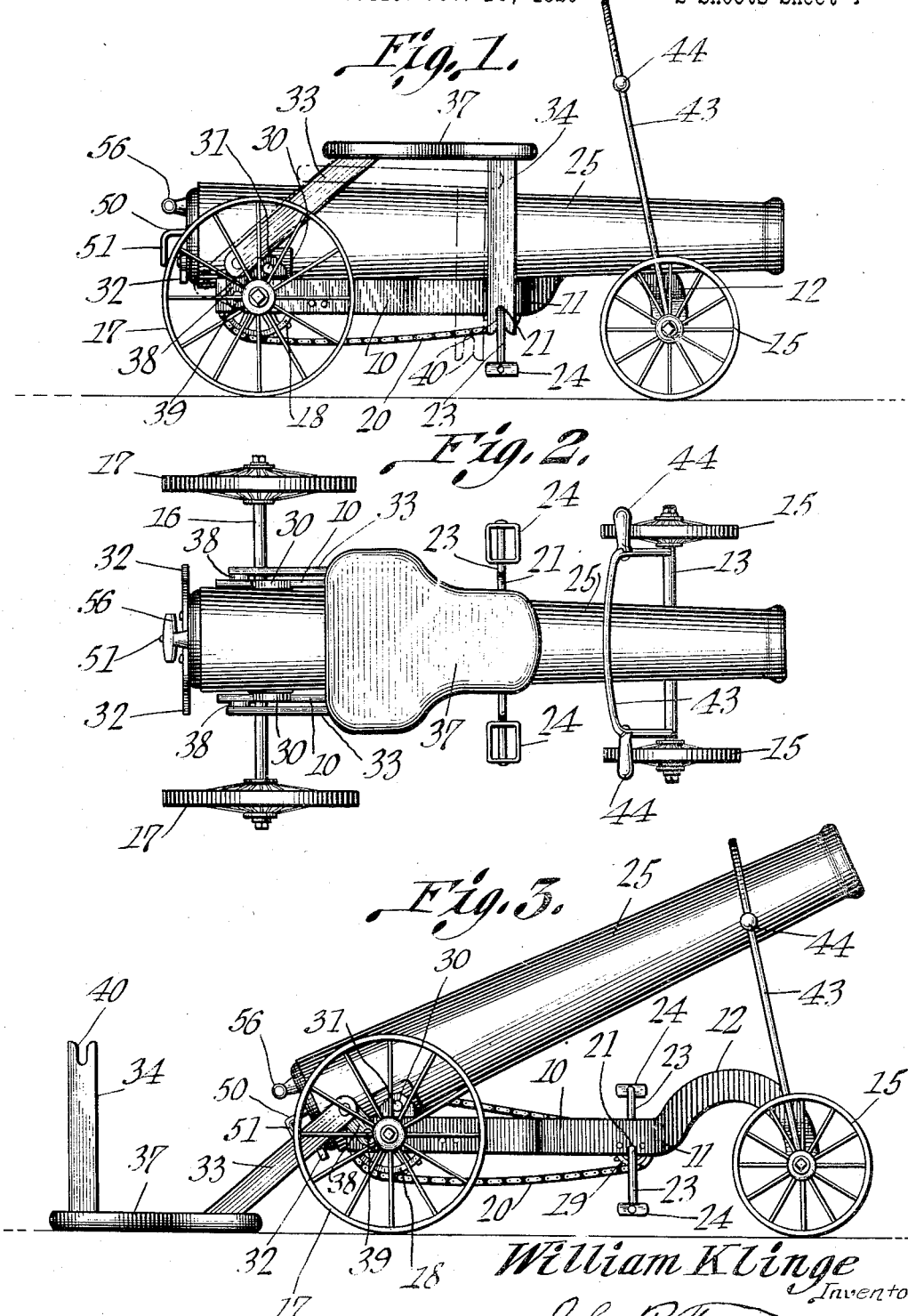
William Klinge, Inventor

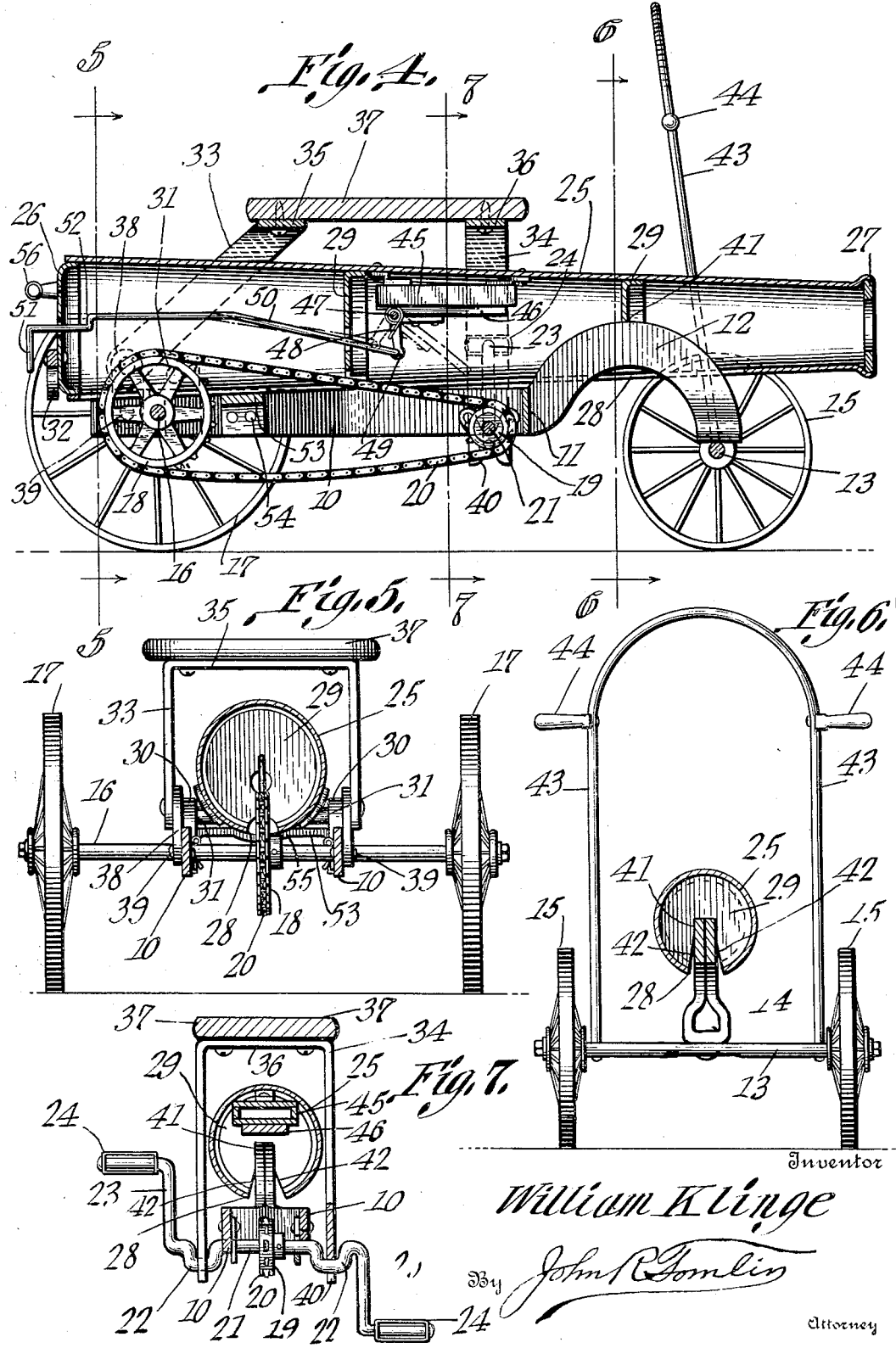

Patented Dec. 18, 1923.

1,477,830

UNITED STATES PATENT OFFICE.

WILLIAM KLINGE, OF ALEXANDRIA, VIRGINIA.

CHILD'S VEHICLE.

Application filed February 14, 1920. Serial No. 358,759.

*To all whom it may concern:*

Be it known that I, WILLIAM KLINGE, a citizen of the United States, residing at Alexandria, in the county of Alexandria and State of Virginia, have invented a new and useful Child's Vehicle, of which the following is a specification.

This invention relates to a child's vehicle, and has for an object the provision of a vehicle having a wheel-supported body so formed as to resemble a cannon or small field gun.

Another object of this invention is to provide a child's vehicle embodying means for pivotally securing a seat or saddle with respect to the cannon-shaped body member, and so constructed that the seat may be moved about its pivot in order to elevate the cannon to its firing position.

A further object of this invention is to provide a child's vehicle having a cannon-shaped body provided with a sound producing firing device, a driving mechanism, steering means, and an adjustable seat or saddle pivotally secured to a supporting frame and adapted to coöperate with the driving mechanism in order to impart a rocking motion to the seat member.

It is also an object of this invention to provide a seat member, that may be supported in either a rocking position or in fixed relation to the vehicle, while the vehicle is being propelled; and means being provided for rocking the seat member while the vehicle is stationary.

An additional object of this invention is to provide a child's vehicle of generally improved construction, whereby the device will be simple, durable and inexpensive in construction, as well as convenient, practical, efficient and serviceable in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

The invention has been illustrated in its preferred embodiments in the accompanying drawings wherein:—

Figure 1 is a side elevation of the device, showing the seat or saddle in its stationary position by dotted lines.

Figure 2 is a top plan view.

Figure 3 is a side elevation showing the cannon in its elevated or firing position.

Figure 4 is an enlarged longitudinal sectional view of the device.

Figure 5 is a transverse sectional view taken on line 5—5 of Figure 4.

Figure 6 illustrates a transverse sectional view taken on a line 6—6 of Figure 4.

Figure 7 is a transverse sectional view taken on line 7—7 of Figure 4.

Referring to the drawings, there is shown a wheel supported frame comprising opposed side members 10, which are united at their forward ends, as indicated at 11, and from this point an arched supporting yoke 12 extends forwardly, and has its forward end pivotally secured to the intermediate portion of a steering axle 13, by means of a king pin or bolt 14, and ground wheels 15 are journalled on the opposed ends of the steering axle 13. A drive shaft or axle 16 is journalled to the rear ends of the side members 10 and has ground wheels 17 secured to the opposed ends thereof. This shaft 16 has a relatively large sprocket 18 secured to its intermediate portion, which sprocket is operatively connected with a relatively small sprocket 19, through the instrumentality of a chain 20, and the small sprocket 19 is carried by a crank shaft 21 journalled to the side members 10 of the supporting frame. Offsets or crank portions 22 are formed at the opposed terminals of the shaft 21 and from the crank portions 22 relatively long crank arms 23 extend, these arms 23 have operating pedals 24 journalled thereon.

A body member is provided and is shaped to resemble a cannon or field piece. This body member comprises an approximately cylindrical casing 25 having its rear end closed by a wall 26, and an annulus or reinforcing ring 27 is secured within its forward end. A longitudinal slot 28 is formed in the lower portion of the cannon-shaped casing 25 and spaced reinforcing discs or plates 29 are positioned within the casing and secured thereto. The casing 25 is pivotally secured to bearing blocks 30 carried by the side members 10, as indicated at 31, and arms or fingers 32 are secured to the head or wall 26 of the casing and extend laterally beyond the casing 25. A seat or saddle frame is provided and includes opposed U-shaped frames or seat supporting members 33 and 34 which have their intermediate portions 35 and 36 rigidly secured to a seat or saddle 37. The lower or out terminals of the frame member 33 are pivotally secured to links 38 which are, in turn, pivotally secured to the side members 10, as indicated at 39. Slots or notches 40 are formed in the lower terminals of the front seat supporting member 34, and these slots are adapted to receive the intermediate portions of the cranks 22. One of the reinforcing plates 29 has a radially extending recess 41 formed therein, and from this recess laterally flaring guide edges 42 extend, which are adapted to engage the intermediate portion of the yoke 12 in order to cause the recess 41 to straddle this yoke when the cannon is in its running or lowered position.

A U-shaped steering yoke or member 43 has its opposed terminals secured to the steering axle 13, and laterally extending handle members 44 are secured to this steering yoke. A sound-producing device is provided and includes a sound-box 45 which is rigidly secured to the inner face of the casing 25, and a clapper or impinging member 46 is pivotally secured to the inner face of this box, as shown at 47. The impinging member 46 is normally held in engagement with the inner face of the sound-box, by means of a spring 48 that is coiled about the pivot pin 47.

An arm 49 extends from the impinging member and is pivotally connected at its outer end to a rod or link 50, which extends through an aperture formed in the wall 26 of the cannon-shaped body or casing, and the rod 50 has a manipulating handle 51 formed at the outer end thereof. The outward movement of the rod 50 is limited by an offset or stop member 52, formed intermediate the ends of the rod, and adapted to engage the inner face of the rear wall 26. By this arrangement a loud sound may be produced by simply gripping the handle member 51 and moving the rod 50 rearwardly, which action moves the impinging member 46 about its pivot 47 against the tension of the spring 48. When the stop member 52 engages the wall 26, the handle 51 is released and the impinging member 46 will violently strike the sound-box and consequently produce a loud sound.

In order to support the cannon or casing 25 when in its lowered position, a brace strap 53 extends transversely between the side members 10 and is rigidly secured to these side members, as shown at 54. This brace 53 is slightly bowed or curved intermediate its terminals, as shown at 55, and this bowed portion receives the outer face of the casing 25, thereby relieving the pivots 31 of the weight of the casing and operator or user.

A handle member 56 is secured to the wall 26, and the handle may be shaped to resemble the usual breech locking handle employed in the present cannon or field piece.

In operation, when the device is in its running position the cannon-shaped body member is rigidly supported by the supporting frame, and the handle members 44 are in convenient position for the operator, so that the vehicle may be readily propelled and steered by an operator that is comfortably supported in a sitting position on the saddle or seat member 37. When the crank shaft is operated to propel the device, the crank members 22 will impart a rocking motion to the seat 37. However, when desired, the operator may disengage the notches 40 of the seat-supporting member 34 from the cranks 22, and the entire seat frame is moved rearwardly, which movement is permitted by the links 38, and then the seat rests on the casing 25. In this position the vehicle may be propelled with less effort, thereby enabling the operator to propel the vehicle up inclines or to attain greater speed on horizontal surfaces, because the efforts of the operator may now be directed solely to propelling the vehicle, thus relieving him of the work of raising and lowering his own weight.

If the operator desires to elevate the cannon to its firing position, the seat member is moved rearwardly about its pivots 39 until the frame member 33 engages the arms or fingers 32, and then continued movement of the seat about its pivots will cause the cannon member to rock on its pivot 30 and elevate the forward or muzzle end of the cannon, until the seat 37 engages the ground, as shown in Figure 3.

Now the operator may assume a kneeling position, in which position his knee rests on the inner face of the seat 37, thus holding the seat in engagement with the ground and supporting the cannon in its elevated position. Now the cannon is sighted and the handle member 51 of the firing or sound producing device is drawn rearwardly until the offset stop member 52 engages the wall 26 and then the handle is released allowing the impinging member 46 to violently strike the sound-box, thereby producing a loud sound. The steering arrangement permits relatively short turns to be made with the vehicle, and in turning portions of the wheels 15 pass under the yoke 12 and forward end of the cannon.

If it is desired to impart a rocking motion to the seat without propelling the vehicle, then the notches 40 of the seat supporting member 34 are moved into engagement with the cranks 22, and the chain 20 is disengaged from the small sprocket 19. The crank shaft 21 is then rotated and the crank 22 imparts a rocking motion to the seat 37 but does not propel the vehicle, thus enabling the vehicle to be employed as an indoor toy during inclement weather.

Having thus described the invention, what I claim as new is:—

1. A child's vehicle including a wheel supported frame, a body member pivotally secured to the frame, and a seat pivotally secured to frame, said seat positioned to cooperate with the body member to move said body member about its pivot when the seat is moved about its pivot.

2. A child's vehicle including a wheel-supported frame, a body member pivotally secured to the frame, an arm extending from the body member, and a seat pivotally secured to the frame and positioned to cooperate with the said arm to move the body member about its pivot.

3. A child's vehicle including a wheel-supported frame, a body member pivotally secured to the frame, propelling means carried by the frame, and a seat having one terminal pivotally secured to the frame and the opposed terminal having means for engaging the propelling means to thereby support the seat and to engage the body member to support the seat independently of the propelling means.

4. A child's vehicle including a wheel-supported base, a link having one terminal pivotally secured to the base, a seat pivotally secured to the opposed terminal of the said link, propelling means carried by the frame, and means carried by the seat for engaging and disengaging the propelling means.

5. A child's vehicle including a wheel-supported frame, a body member carried by the frame, a seat having one terminal pivotally supported by the frame, the pivotal connection between the frame and seat being movable, and means carried by the seat for engaging and disengaging the body member and the propelling means to thereby support the seat by the propelling means independently of the body member and to support the seat by the body member independent of the propelling means.

6. A child's vehicle including a wheel-supported frame, a cannon-shaped body member pivotally secured to the said frame, means carried by the body member for engaging and disengaging the frame at a point remote from the said pivotal connection to support the body member in its normal or lowered position, and a seat pivotally secured to the frame and positioned to engage and move the body member about its pivot to elevated or firing position when the seat is moved about its pivot.

7. A child's vehicle including a wheel-supported frame, a body member pivotally secured to the said frame, a seat pivotally secured to the said frame, and means for cooperating with the seat for moving the body member about its pivot.

8. A child's vehicle including a wheel-supported frame, a body member pivotally secured to the said frame, an arm extending from the said body member, means for steering the vehicle, and a seat member pivotally secured to the said frame and adapted to move about its pivot and engage the said arm, thereby moving the body member about its pivot.

9. A child's vehicle including a wheel-supported frame, a body member pivotally secured to the said frame, an arm extending from the said body member, means for steering the vehicle, a link pivotally secured to the said frame, a seat member pivotally secured to said link and adapted to move about its pivot and engage the said arm to thereby move the body member about its pivot and elevate the forward end of the said body member.

10. A child's vehicle including a wheel-supported frame, a body member pivotally secured to the said frame, means for propelling the vehicle, a link pivotally secured to the wheel-supported frame, a seat frame comprising a seat, seat-supporting members rigidly secured to the said seat, one of the seat-supporting members being pivotally secured to the said link, and the opposed seat-supporting member operably engaging the propelling means to impart a rocking motion to the said seat frame.

11. A child's vehicle including a wheel-supported frame, a body member supported by the said frame, a seat frame pivotally secured to the wheel-supported frame, means for propelling the vehicle, said propelling means adapted to propel the vehicle and impart a rocking motion to the seat frame and to propel the vehicle while the seat frame remains stationary relative to the vehicle.

12. A child's vehicle including a wheel-supported frame, a body member supported by the said frame, means for propelling the vehicle, and a seat frame adapted to be supported by the propelling means independently of the body member and by the body member independently of the said propelling means.

In testimony that I claim the foregoing as my own, I have hereto affixed my signature in the presence of two witnesses.

WILLIAM KLINGE.

Witnesses:
CHARLES HENRY SMITH,
NANNIE IRMA COLEMAN.